United States Patent Office 3,322,468
Patented May 30, 1967

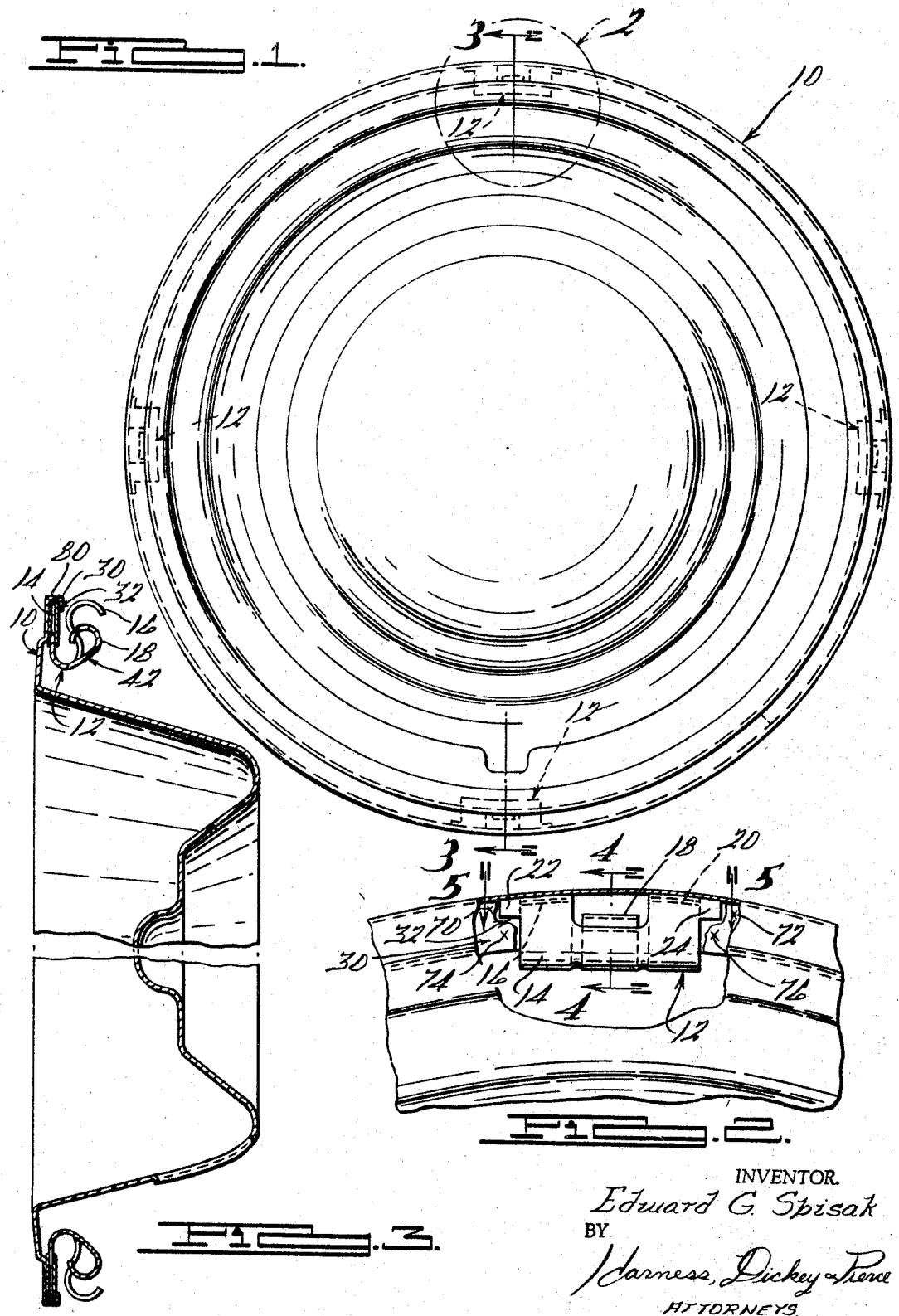

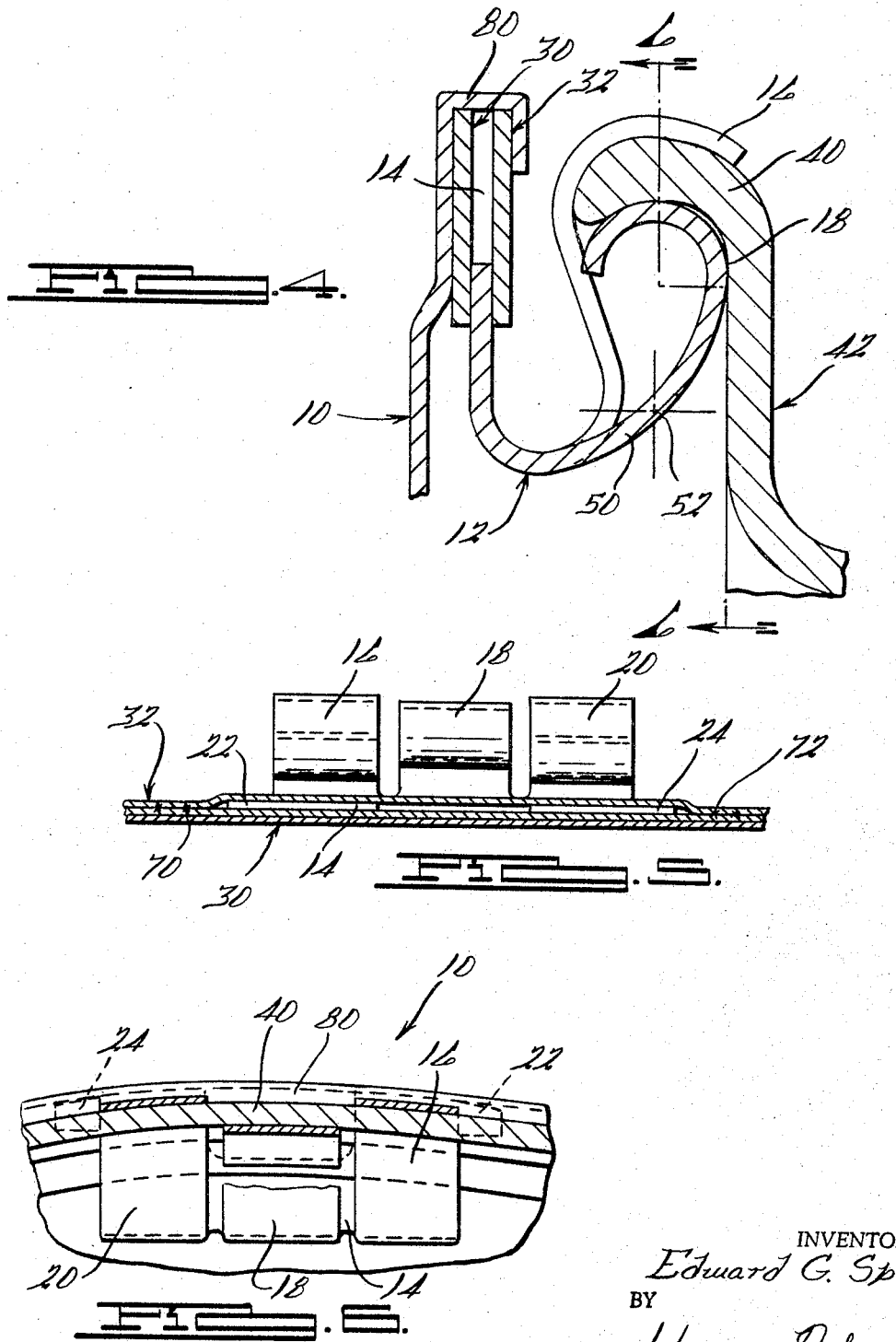

3,322,468
WHEEL COVER
Edward G. Spisak, Wayne, Mich., assignor to Gar Wood Industries, Inc., Wayne, Mich., a corporation of Michigan
Filed Oct. 23, 1965, Ser. No. 503,201
3 Claims. (Cl. 301—37)

This invention relates generally to wheel covers and more particularly to an improved spring clip for retaining a wheel cover to a vehicle wheel.

It has long been the practice in the automobile industry to use spring clips to retain what are termed "full" wheel covers on a vehicle wheel. A "full" wheel cover is a cover that extends radially outwardly to completely cover the outer periphery of the vehicle wheel. Manufacturing problems relating to the drawing of stainless steel generally preclude the use of a one-piece so called "biting" retention with such covers.

Springs clips of the type shown in Patent No. 3,012,823, which is assigned to the assignee of the instant application, have enjoyed wide commercial success but have been the subject of field complaints since they are relatively difficult to remove from the vehicle wheel to effect tire changes. Furthermore, such known spring clips were relatively expensive and difficult to secure to the vehicle wheel.

The aforesaid problems are solved in accordance with the instant invention by a unique spring clip that is engageable with the peripheral flange of a vehicle wheel to secure a wheel cover to the wheel. The clip features an improved geometry that moves the toggle point for the lower holding finger of the clip axially inwardly relative to the vehicle wheel to facilitate removal of the cover from the vehicle wheel. Furthermore, the hardened steel clip is retained in a novel manner within a pair of complementary mild steel bands which in turn are mechanically crimped to the wheel cover. This latter feature completely eliminates two problems experienced with presently known spring clips since there is no requirement that a hard steel clip be welded to relatively softer steel or that the clip be welded to the wheel cover in such a manner that the weld is visible on the exterior of the wheel cover.

Accordingly, one object of the present invention is an improved spring clip for retaining a wheel cover on a vehicle wheel.

Another object is a spring clip for a wheel cover that facilitates removal of the wheel cover from a vehicle wheel.

Another object is a means for retaining a spring clip on a vehicle wheel without requiring welds between the hardened clip and relatively softer steel. Another object is a spring clip for a wheel cover that does not require welds that are visible from the exterior of the wheel cover.

Other objects and advantages of the instant invention will become apparent in the following specification, claims and drawings, wherein:

FIGURE 1 is a front view of a wheel cover for a vehicle wheel having the clips of the instant invention thereon;

FIGURE 2 is a view taken substantially within the circle "2" of FIG. 1;

FIG. 3 is a cross sectional view taken substantially along the line 3—3 of FIG. 1;

FIG. 4 is a view taken substantially along the line 4—4 of FIG. 2;

FIG. 5 is a view taken substantially along the line 5—5 of FIG. 2; and

FIG. 6 is a view taken in the direction of the arrow 6 of FIG. 4.

As best seen in FIGURE 1 of the drawings, a wheel cover 10 is provided with a plurality of spring clips 12 that are spaced at, for example, 90° relative to one another on the periphery of the wheel cover.

As best seen in FIGS. 2–6 of the drawings, each spring clip 12 comprises a shank portion 14 having three generally reentrantly folded fingers 16, 18 and 20 extending therefrom. The shank portion 14 has oppositely circumferentially extending ears 22 and 24 thereon to facilitate retention of the spring clip 12 within a pair of circular retaining bands 30 and 32, as will be discussed in greater detail.

As best seen in FIG. 4 of the drawings, the fingers 16 and 20 of the clip 12 overlie a peripheral flange 40 of a vehicle wheel 42, while the center finger 18 underlies the peripheral flange 40. In this manner a resilient lock is obtained on the flange 40 of the wheel 42 by the fingers 16, 18 and 20.

In accordance with one feature of the instant invention, the finger 18 has a lower portion 50 that is substantially vertically aligned with the areas of engagement between the fingers 16, 18 and 20 with the wheel 42. Thus, when it is desired to remove the wheel cover 10 from the vehicle wheel, the finger 18 tends to toggle about a point, designated by the numeral 52, that is relatively close to the vehicle wheel. Rotation of the finger 18 about this point does not result in an excessive interference with the flange portion 40 of the wheel 42 permitting the wheel cover 10 to be readily removed from the vehicle wheel. In spring clips heretofore known and used, the toggle point of an equivalent finger to the finger 18 was spaced well away from the wheel resulting in movement of the finger 18 into an interference condition with the flange 40 of the vehicle wheel 42.

In accordance with another feature of the instant invention, the spring clip 12 is secured to the retainer rings 30 and 32 by what may be termed "entrapment" as opposed to welding. Because there are no direct welds between the clip 12 and the rings 30 and 32 or the wheel cover 10, the problems inherent in welding a relatively hard piece of steel to a softer piece of steel are obviated.

Retention of the spring clip 12 to the rings 30 and 32 and thereafter to the wheel cover 10 is effected by first welding the rings 30 and 32 at points designated by the numerals 70, 72, 74 and 76 in FIG. 2 of the drawings. It is to be noted that the weld points 70 and 72 are circumferentially spaced from the ears 22 and 24 of the clip 12 and that the weld points 74 and 76 are radially inwardly spaced from the ears 22 and 24. The weld points designated 72–76 in conjunction with the peripheral edge 80 of the wheel cover 10, which is reentrantly folded about the rings 30 and 32, effectively traps the clip 12 to the wheel cover 10.

One obvious advantage to the aforesaid construction is that weld blemishes on the exterior of the wheel cover 10 are completely eliminated.

Another advantage of the aforesaid construction is that the inherent difficulty of welding hard steel to soft steel is eliminated. Thus, relatively hard steel can be used for the clips 12 and relatively softer and less expensive steel can be used for the rings 30 and 32.

It is to be understood that the specific construction of the improved wheel cover herein disclosed and described is presented for the purpose of explanation and illustration and is not intended to indicate limits of the invention, the scope of which is defined by the following claims.

What is claimed is:
1. In a wheel assembly comprising a vehicle wheel having an axially extending terminal flange, a circular wheel cover of substantially the same diameter as the terminal flange of the wheel, and a plurality of spring clips disposed at intervals around the periphery of said cover for gripping the terminal flange of said wheel, an improved means for securing said clips to said wheel cover comprising a generally T-shaped shank portion on each of said clips, and a pair of radially extending juxtaposed annular rings, the T-shaped shank portion of said clips being interposed between said rings, said rings being welded to one another on circumferentially opposite sides of the T-shaped shank portion of said clips and radially inwardly spaced from the T-shaped shank portion of said clips to preclude both circumferential and radially inward movement of said clips relative to said rings, said cover having a peripheral flange folded radially inwardly about the radially outer periphery of said rings to both retain said rings and to preclude radially outward movement of said clips relative thereto.

2. In a wheel assembly comprising a vehicle wheel of the type having an axially extending terminal flange and a circular wheel cover of approximately the same diameter as the terminal flange of the wheel, an improved means for securing said cover to said wheel comprising a plurality of spring clips on said wheel cover at intervals around the periphery thereof for gripping the terminal flange of said wheel, each of the said clips being formed of a single piece of hardened spring steel material and comprising a radially extending shank portion for attaching said clip to the cover, and three circumferentially spaced fingers extending radially outwardly from said shank portion, the circumferentially outer fingers extending over and engaging the radially outer surface of the terminal flange of said wheel and the intermediate finger engaging the radially inner surface of the terminal flange of said wheel, said fingers coacting with each other to grip the terminal flange with a pinching action, said central finger extending in a radially inwardly direction for a substantial distance so as to be bendable about a point spaced radially inwardly from and generally radially aligned with its point of engagement with the terminal flange of said wheel to facilitate removal of said cover from said wheel.

3. In a wheel assembly comprising a vehicle wheel of the type having an axially extending terminal flange and a circular wheel cover of approximately the same diameter as the terminal flange of the wheel, an improved means for securing said cover to said wheel comprising a pair of radially extending juxtaposed annular rings, and a plurality of spring clips disposed at intervals around the periphery thereof for gripping the terminal flange of said wheel, each of said clips being formed of a single piece of hardened spring steel material and comprising a generally T-shaped radially extending shank portion, the T-shaped shank portion of said clips being interposed between said rings, said rings being welded to one another on circumferentially opposite sides of the T-shaped shank portion of said clips and radially inwardly spaced from the T-shaped shank portion of said clips to preclude both circumferential and radially inward movement of said clips relative to said rings, said cover having a peripheral flange folded radially inwardly about the radially outer periphery of said rings to both retain said rings and to preclude radially outward movement of said clips relative thereto, each of said clips having three circumferentially spaced fingers extending radially outwardly from said shank portion, the circumferentially outer fingers extending over and engaging the radially outer surface of the terminal flange of said wheel and the intermediate finger engaging the radially inner surface of the terminal flange of said wheel, said fingers coacting with each other to grip the terminal flange with a pinching action, said central finger extending in a radially inwardly direction for a substantial distance so as to be bendable about a point spaced radially inwardly from and generally radially aligned with its point of engagement with the terminal flange of said wheel to facilitate removal of said cover from said wheel.

References Cited

UNITED STATES PATENTS

| 2,526,026 | 10/1950 | Horn | 301—37 |
| 2,910,323 | 10/1959 | Spisak | 301—37 |
| 3,012,822 | 12/1961 | Mulhern | 301—37 |
| 3,012,823 | 12/1961 | Spisak | 301—37 |
| 3,095,241 | 6/1963 | Fitzgerald | 301—37 |

FOREIGN PATENTS 516,424  9/1955  Canada.

BENJAMIN HERSH, *Primary Examiner.*

R. J. JOHNSON, *Assistant Examiner.*